United States Patent
Yeo et al.

(10) Patent No.: US 8,514,831 B2
(45) Date of Patent: Aug. 20, 2013

(54) METHOD FOR REQUESTING RESOURCE BASED ON TIMER IN MOBILE TELECOMMUNICATION SYSTEMS

(75) Inventors: Geon-Min Yeo, Daejon (KR); Byung-Han Ryu, Daejon (KR)

(73) Assignees: Electronics and Telecommunications Research Institute, Daejeon (KR); Samsung Electronics Co., Ltd., Suwon-Si, Gyeonggi-Do (KR)

( * ) Notice: Subject to any disclaimer, the term of this patent is extended or adjusted under 35 U.S.C. 154(b) by 651 days.

(21) Appl. No.: 12/293,977

(22) PCT Filed: Mar. 22, 2007

(86) PCT No.: PCT/KR2007/001404
§ 371 (c)(1),
(2), (4) Date: Sep. 22, 2008

(87) PCT Pub. No.: WO2007/108657
PCT Pub. Date: Sep. 27, 2007

(65) Prior Publication Data
US 2009/0225739 A1    Sep. 10, 2009

(30) Foreign Application Priority Data

Mar. 22, 2006   (KR) .................. 10-2006-0026244
Mar. 8, 2007    (KR) .................. 10-2007-0022856

(51) Int. Cl.
*H04J 3/00*   (2006.01)
*G01R 31/08*  (2006.01)

(52) U.S. Cl.
USPC ........................................ 370/345; 370/236

(58) Field of Classification Search
USPC ........................................................ 370/345
See application file for complete search history.

(56) References Cited

U.S. PATENT DOCUMENTS

| | | | | |
|---|---|---|---|---|
| 5,570,367 A * | 10/1996 | Ayanoglu et al. | ............. | 370/346 |
| 5,590,133 A * | 12/1996 | Billstrom et al. | ............. | 370/349 |
| 8,019,348 B2 * | 9/2011 | Choi et al. | ............. | 455/442 |
| 2002/0094814 A1 * | 7/2002 | Wigell et al. | ............. | 455/436 |
| 2004/0017792 A1 | 1/2004 | Khaleghi et al. | | |
| 2004/0224677 A1 * | 11/2004 | Kuchibhotla et al. | ....... | 455/422.1 |
| 2005/0265301 A1 * | 12/2005 | Heo et al. | ............. | 370/349 |
| 2006/0164981 A1 * | 7/2006 | Olsson et al. | ............. | 370/229 |
| 2006/0182022 A1 * | 8/2006 | Abedi | ............. | 370/229 |
| 2006/0198347 A1 * | 9/2006 | Hurtta et al. | ............. | 370/338 |
| 2006/0251105 A1 * | 11/2006 | Kim et al. | ............. | 370/449 |

(Continued)

FOREIGN PATENT DOCUMENTS

| | | |
|---|---|---|
| KR | 10-2005-0062333 | 6/2005 |
| WO | 2005/034444 | 4/2005 |

OTHER PUBLICATIONS

International Search Report corresponding to PCT7KR2007/001404 dated Jul. 9, 2007.

*Primary Examiner* — Gerald Smarth
(74) *Attorney, Agent, or Firm* — Kile Park Reed & Houtteman PLLC (57) ABSTRACT

Provided is a timer-based resource requesting method in a mobile telecommunication system. The resource requesting method includes the steps of: a) waiting in a waiting mode for an event to occur while a timer of a terminal operates; b) transmitting scheduling information including information on a quantity of packets existing in a terminal buffer to a base station when operation of the timer ends at a predetermined threshold time; and c) initializing the timer.

5 Claims, 4 Drawing Sheets

(56) References Cited

U.S. PATENT DOCUMENTS

| | | | |
|---|---|---|---|
| 2006/0268708 A1* | 11/2006 | Speight et al. | 370/235 |
| 2007/0004415 A1* | 1/2007 | Abedi | 455/442 |
| 2007/0149194 A1* | 6/2007 | Das et al. | 455/436 |
| 2008/0232260 A1* | 9/2008 | Yeo et al. | 370/242 |
| 2010/0099427 A1* | 4/2010 | Abedi | 455/450 |
| 2010/0142469 A1* | 6/2010 | Abedi | 370/329 |

* cited by examiner

FIG. 3

Example. 1

Example. 2

Events:
A: packets arrival
D: packets discard
R: random access
Q: query
S: scheduled
E: buffer empty
O: success in receiving resource allocation signaling or RA message
X: fail in receiving resource allocation signaling or RA message
━: query time
──: request timer

FIG. 4

METHOD FOR REQUESTING RESOURCE BASED ON TIMER IN MOBILE TELECOMMUNICATION SYSTEMS

TECHNICAL FIELD

The present invention relates to a timer-based resource requesting method in a mobile telecommunication system; and, more particularly, to a resource requesting method for transmitting a traffic to uplink in a packet-based mobile telecommunication system.

BACKGROUND ART

A standard and system for wireless Internet service has been actively developed based on Broadband Radio Access Network High Performance Local Area Network (BRAN HIPERLAN)/2, Institute of Electrical and Electronic Engineers (IEEE) 802.11, IEEE 802.16 and $3^{rd}$ Generation Partnership Project (3GPP) standardization organization. Also, a packet transmission technology has become important to preoccupy the technological prowess of a $4^{th}$ generation mobile telecommunication system based on a packet. Herein, the IEEE 802.16 and 3GPP Release 6 are cellular series. The IEEE 802.11 and HIPERLAN 2 is LAN series. The IEEE 802.16 series include IEEE 802.16d, which is already standardized, and IEEE 802.16e, which is to be standardized soon. In the 3GPP Release 6, resource request and uplink scheduling development has been progressed under a work item called Uplink Enhancement (HSUPA). The HIPERLAN 2 is completely developed in 2002 and introduces a concept of Local Area Network (LAN)-based cellular and Orthogonal Frequency Division Multiplexing (OFDM) transmitting method.

A resource requesting and uplink packet scheduling method for satisfying quality of service (QoS) request and maximizing efficiency of radio resources in packet transmission is a specialized field of a wireless link sharing method. Also, the resource requesting and uplink packet scheduling method is important to improve capacity of the system in comparison with a typical circuit method. Uplink scheduling is performed based on scheduling information, which is transmitted to request resource such as QoS information when connection is set up and buffer status information reported from the terminal. The QoS information is an index to be averagely and ultimately satisfied by the uplink scheduling. The scheduling information is a standard for indicating a level of short-term service satisfaction of a user element. Optimal uplink scheduling may be performed when the QoS information and the scheduling information are converged.

The resource request denotes a series of procedures that the terminal notifies to the base station whether data to be transmitted to uplink exist and whether allocation of required resource is requested. Since the uplink scheduling is performed based on a buffer status reported by the terminal differently from the downlink scheduling, which transmits data while grasping a buffer status in downlink in real-time, an efficient resource request method for maximizing wireless resource application and providing the QoS is required. A property of a report time should be considered to efficiently perform the resource request method.

A proper report time means that the report should be performed at a proper time to secure the QoS. For example, when the report is not performed at a proper time in a status that a quantity of packets waiting in a current terminal buffer increases, the transmitted data, to which uplink resource is allocated, do not satisfy a delay request in a network point of view. Therefore, successfully transmitted data may be discarded. The higher a report frequency is, the more the uplink scheduling performance improves. However, there is a tradeoff that wireless resources are used excessively. The proper report time is closely related to the delay from a time that the terminal determines the resource request to a time that the base station finally recognizes. The more the delay increases, the less the useful the transmission data become. The matters related to the resource request delay have a close relationship with a frame structure and a channel structure design.

Therefore, it is required to realize the resource request scheme in the mobile telecommunication system which can efficiently be operated according to the uplink traffic characteristics by satisfying the property of the report time.

DISCLOSURE

Technical Problem

An embodiment of the present invention is directed to providing a timer-based resource requesting method which can secure Quality-of-Service (QoS) according to diverse uplink traffic characteristics in a packet-based mobile telecommunication system by performing a resource request procedure between a base station and a terminal based on a timer.

Other objects and advantages of the present invention can be understood by the following description, and become apparent with reference to the embodiments of the present invention. Also, it is obvious to those skilled in the art of the present invention that the objects and advantages of the present invention can be realized by the means as claimed and combinations thereof.

Technical Solution

In accordance with an aspect of the present invention, there is provided a timer-based resource requesting method in a mobile telecommunication system, including the steps of: a) waiting in a waiting mode for an event to occur while a timer of a terminal operates; b) transmitting scheduling information including information on a quantity of packets existing in a terminal buffer to a base station when operation of the timer ends at a predetermined threshold time; and c) initializing the timer.

Advantageous Effects

The present invention can request resource at a right time by processing a resource request procedure between a base station and a terminal based on a timer in a packet-based mobile telecommunication system.

Also, the present invention can secure quality of service (QoS) according to diverse uplink traffic characteristics in a Medium Access Control (MAC) layer of the packet-based mobile telecommunication system.

BEST MODE FOR THE INVENTION

In accordance with an aspect of the present invention, there is provided a timer-based resource requesting method in a mobile telecommunication system, including the steps of: a) waiting in a waiting mode for an event to occur while a timer of a terminal operates; b) transmitting scheduling information including information on a quantity of packets existing in a terminal buffer to a base station when operation of the timer ends at a predetermined threshold time; and c) initializing the timer.

In accordance with another aspect of the present invention, there is provided a timer-based resource requesting method in a mobile telecommunication system, including the steps of: a) waiting in a waiting mode for an event tp occur while a timer of a terminal operates; b) receiving a query from a base station; c) transmitting scheduling information to the base station based on resource allocation information of the query; and c) initializing the timer, wherein the query includes uplink resource allocation information for transmitting the scheduling information.

In accordance with another aspect of the present invention, there is provided a timer-based resource requesting method in a mobile telecommunication system, including the steps of: a) waiting in a waiting mode for an event to occur while a timer of a base station operates; b) transmitting a query to the terminal when operation of the timer ends at a predetermined threshold time; and c) initializing the timer, wherein the query includes uplink resource allocation information for transmitting scheduling information.

In accordance with another aspect of the present invention, there is provided a timer-based resource requesting method in a mobile telecommunication system, including the steps of: a) waiting in a waiting mode for an event to occur while a timer of a base station operates; b) receiving a random access message including scheduling information from a terminal; and c) initializing the timer, wherein the scheduling information includes information on a quantity of packets existing in a terminal buffer.

Other objects and advantages of the present invention will become apparent from the following description of the embodiments with reference to the accompanying drawings. Therefore, those skilled in the field of this art of the present invention can embody the technological concept and scope of the invention easily. In addition, if it is considered that detailed description on a related art may obscure the points of the present invention, the detailed description will not be provided herein. The preferred embodiments of the present invention will be described in detail hereinafter with reference to the attached drawings.

In a timer-based resource request scheme according to the present invention, while a base station and a terminal respectively maintain an independent timer, the base station and the terminal control the resource request. One terminal can have a plurality of uplinks according to each traffic and resource is basically requested to a specific link of the terminal.

The terminal has a request timer, which increases by 1 every unit time, i.e., a slot. When a value of the request timer accesses a threshold $T_r$, the terminal transmits scheduling information (SI) to the base station using a random access (RA) message, and resets the request timer. The random access message is operated based on contention. That is, when a plurality of terminals simultaneously transmit a message, the base station may not analyze the message of the terminal. The base station successfully receiving the random access message can use the scheduling information on further scheduling.

Meanwhile, the base station has a query timer, which increases by 1 per unit time. The query includes resource allocation information that the base station allocates not for data transmission but for scheduling information transmission to figure out a quantity of packets waiting in a current terminal, i.e., buffer occupancy (BO), and Head-Of-Line (HOL) delay. The resource allocation for query is operated based on non-contention. When a value of the query timer excesses a threshold $T_q$, the base station transmits the query to the terminal and resets the query timer. The terminal successfully receiving the query allocates scheduling information for notifying a current buffer status to the resource and transmits the scheduling information to the base station. The base station uses the transmitted scheduling information in future scheduling.

The request timer of the terminal is reset in a case that the request timer successfully receives the query from the base station, that the request timer successfully receives uplink resource allocation information from the base station, that time-out of the request timer is performed, that new data arrive and a random access message is transmitted, or that the waiting packet is discarded due to access of the delay threshold and the random access message is transmitted.

The query timer of the base station is reset in a case that the query timer reaches a predetermined time, that scheduling of the terminal is performed, that a protocol data unit (PDU) including scheduling information is received, or that a random access message including scheduling information is successfully received.

A resource request procedure may be redefined as a series of procedures that the terminal reports scheduling information for uplink traffic to the base station. The scheduling information includes buffer occupancy and Head-Of-Line delay information. The buffer occupancy is generally represented as the number of bytes or byte units.

The terminal according to the present invention transmits scheduling information to the base station according to diverse methods below. That is, when the terminal receives the query from the base station, the terminal can transmit scheduling information using resource for transmitting the scheduling information allocated by the query. When the request timer reaches a predetermined time, the terminal can transmit scheduling information using the random access message. When the request timer receives allocation information for transmitting uplink data, on which uplink scheduling is performed, from the base station, the terminal can transmit the allocation information by piggybacking scheduling information on the transmission data.

According to a scheduling information transmitting method by the query, the scheduling information is transmitted through information element (IE) without transmitting data using media access control (MAC) status protocol data unit. The scheduling information transmitting method by piggybacking of the transmission data includes a method for transmitting scheduling information to a header of the MAC protocol data unit for data transmission through information element and a method for transmitting scheduling information through information element by being concatenated to the MAC protocol data unit for data transmission.

Figure 1:
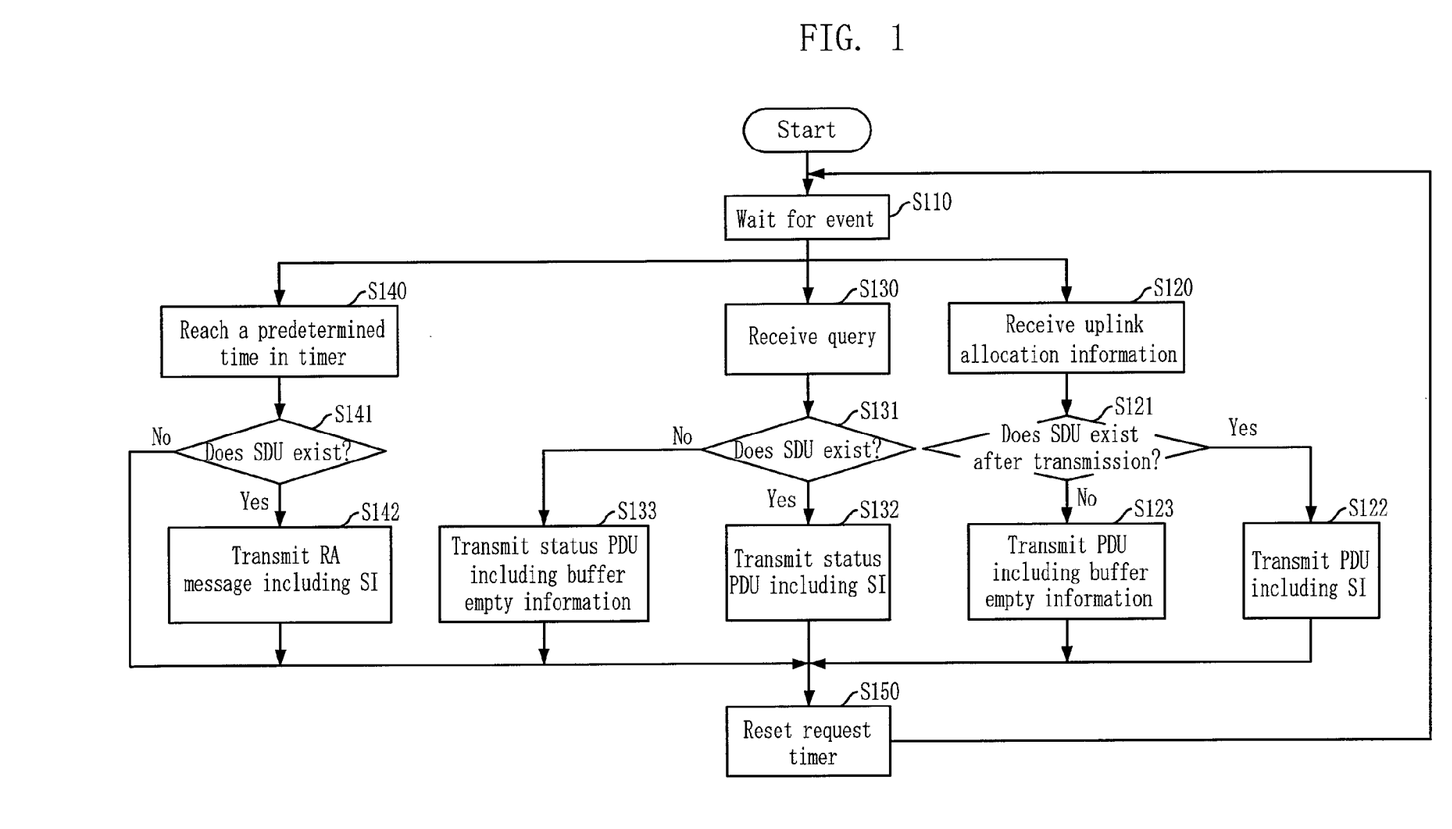
FIG. 1 is a flowchart describing a timer-based resource request procedure in the terminal in accordance with an embodiment of the present invention.

FIG. 1 is a flowchart describing a timer-based resource request procedure in the terminal in accordance with an embodiment of the present invention.

At step S110, the terminal waits occurring of an event in a waiting mode that the request timer is operating.

When the terminal receives uplink allocation information from the base station in the waiting mode of the step S110 at step S120, the terminal transmits data using allocated wireless resource and determines at step S121 whether a non-transmitted service data unit (SDU) exists in a buffer. When it turns out at the step S121 that the service data unit exists, the terminal transmits scheduling information to the base station by piggybacking scheduling information including a quantity of packets waiting in a current buffer, i.e., buffer occupancy, and Head-Of-Line delay information to the protocol data unit at step S122. When the service data unit does not exist, the terminal transmits scheduling information including buffer empty information to the base station by piggybacking the scheduling information in the protocol data unit at step S123, resets a request timer at step S150, and goes back to the waiting mode of the step S110.

When the terminal receives the query from the base station in the waiting mode of the step S110 at step S130, the terminal determines at step S131 whether the service data unit exists in the buffer. When it turns out at step S131 that the service data unit exists in the buffer, scheduling information including buffer occupancy and Head-Of-Line delay information is transmitted using the status protocol data unit at step S132. When the service data unit does not exist, the terminal transmits the scheduling information including buffer empty information to the base station using the status protocol data unit at step S133, resets the request timer at step S150, and goes back to the waiting mode of the step S110.

When the timer reaches a predetermined time in the waiting mode of the step S110 at step S140, the terminal determines at step S141 whether the service data unit exists in the buffer. When the service data unit exists in the buffer, the terminal transmits scheduling information including the buffer occupancy and Head-Of-Line delay information using the random access message at step S142. When the service data unit does not exist in the buffer, the terminal resets the request timer without an individual process at step S150 and goes back to the waiting mode of the step S110.

Figure 2:
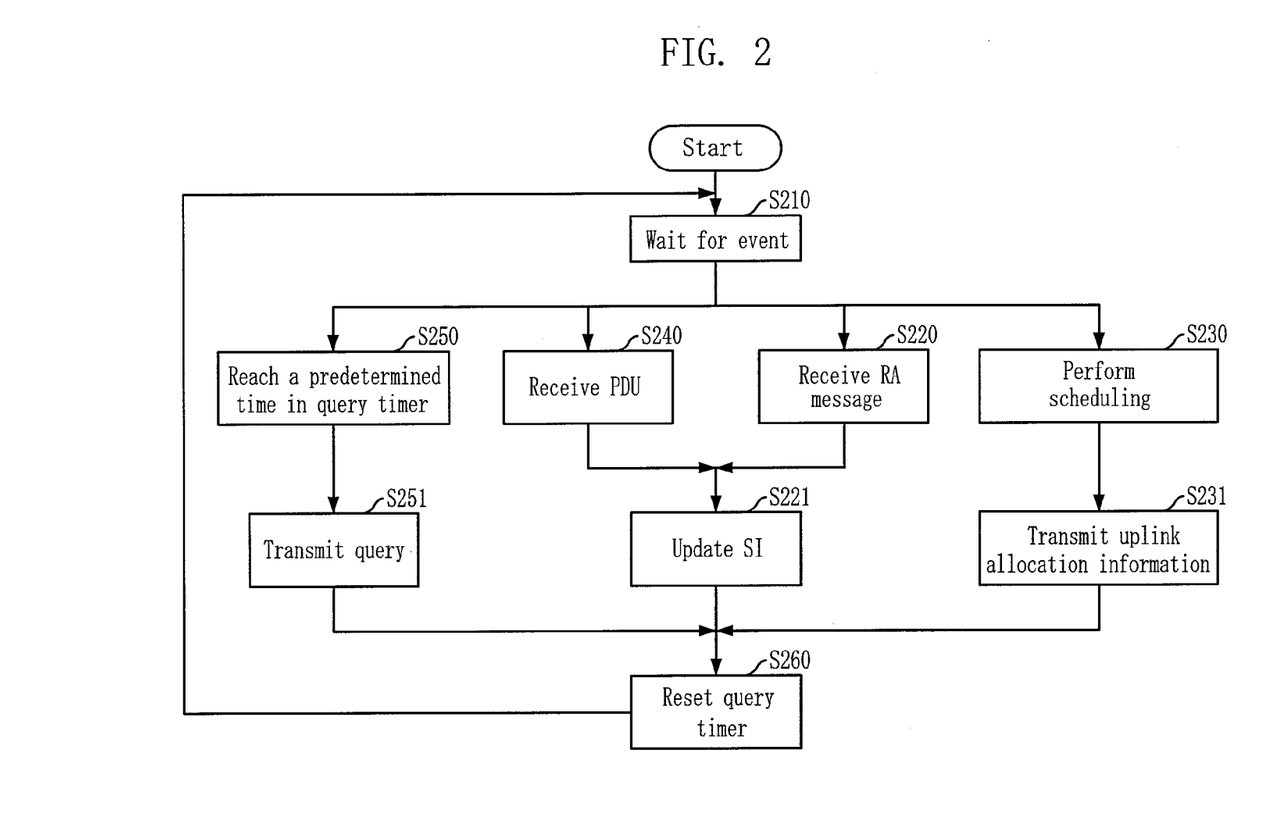
FIG. 2 is a flowchart describing a timer-based resource request procedure in the base station in accordance with the embodiment of the present invention

FIG. 2 is a flowchart describing a timer-based resource request procedure in the base station in accordance with the embodiment of the present invention.

At step S210, the base station waits occurring of an event in a waiting mode that a query timer is operating.

When the base station receives a random access message including scheduling information from the terminal in the waiting mode of the step S210 at step S220, the base station updates the scheduling information at step S221, resets the query timer at step S260, and goes back to the waiting mode of the step S210.

When the base station performs scheduling on the terminal in the waiting mode of the step S210 at step S230, the base station transmits uplink allocation information at step S231, resets the query timer at the step S260, and goes back to the waiting mode of the step S210.

When the base station receives the protocol data unit including scheduling information from the terminal in the waiting mode of the step S210 at step S240, the base station updates the scheduling information at the step S221, resets the query timer at the step S260, and goes back to the waiting mode of the step S210.

When the query timer reaches a predetermined time in the waiting mode of the step S210 at step S250, the base station transmits the query to the terminal at step S251, resets the query timer at the step S260, and goes back to the waiting mode of the step S210.

Figure 3:
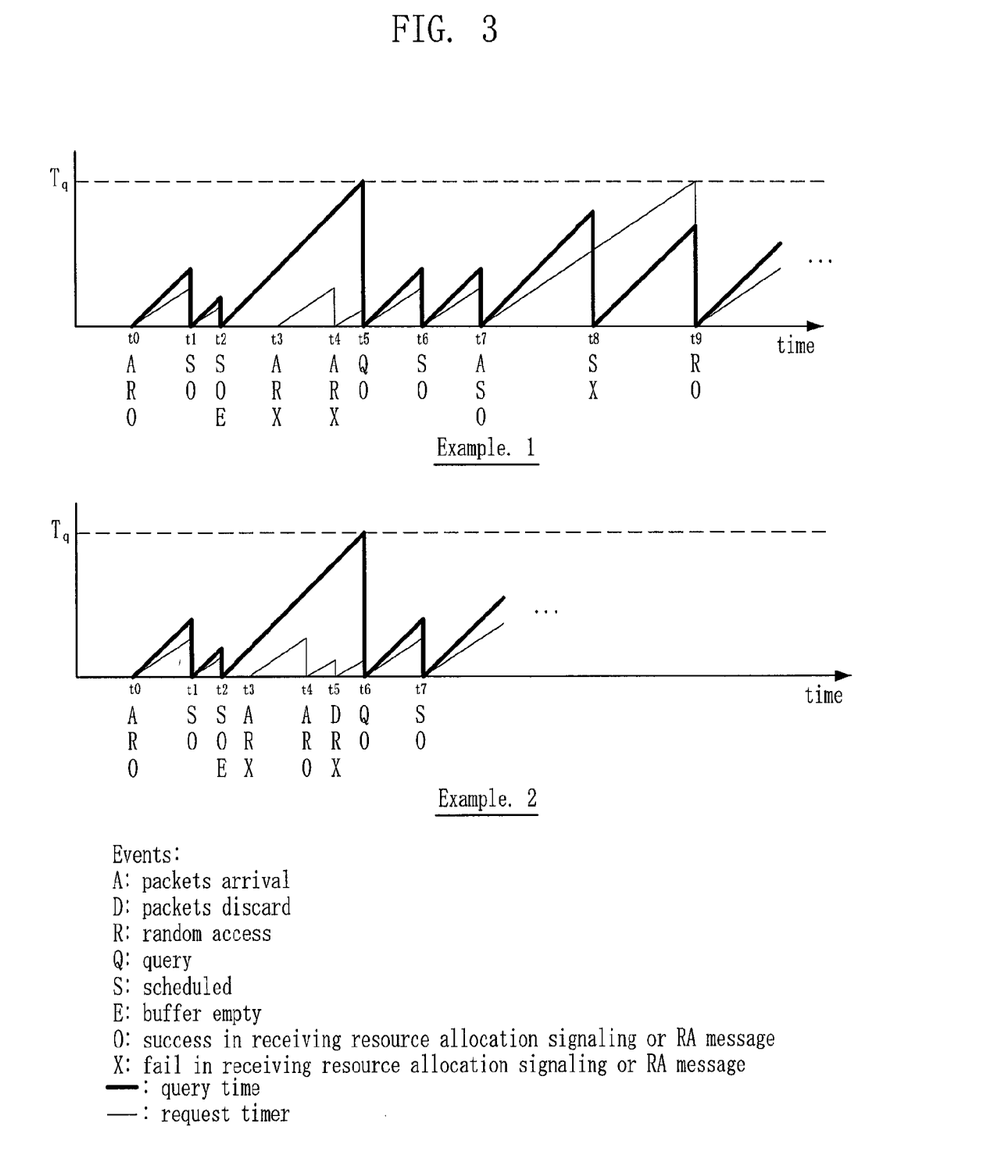
FIG. 3 shows an operation of the base station and the terminal in which the timer-based resource request procedure is executed in accordance with the embodiment of the present invention.

FIG. 3 shows an operation of the base station and the terminal in which the timer-based resource request procedure is executed in accordance with the embodiment of the present invention.

Referring to FIG. 3, a thick line denotes the operation of the query timer and a thin line denotes the operation of the request timer. When the same threshold is set as $T_q$ under assumption that the query timer increases by 1 on the basis of unit time and the request timer increases by $\delta=T_q/T_r$ on the basis of unit time, it becomes identical with the timer operation described above. A related event is as shown in Table 1 below.

TABLE 1

| Division | Event |
|---|---|
| A | A new packet arrives at buffer. |
| D | A packet is discarded. |
| R | A random access message is transmitted from terminal. |
| Q | A query is transmitted from the base station. |
| S | A terminal is scheduled. |
| E | A buffer is empty. |
| O | The terminal succeeds to receive resource allocation information from the base station. |
| X | The terminal fails to receive the resource allocation information from the base station. |

The operation shown in an example 1 of FIG. 3 will be described in detail.

At a time t0, when a new packet arrives in a status that a current buffer is empty, the terminal transmits scheduling information for notifying a current buffer status using the random access message and resets the request timer. When the base station successfully receives the message, the query timer is reset.

At a time t1, the base station performs scheduling on the terminal, transmits uplink allocation information for data transmission, and resets a query timer. When the terminal successfully receives resource allocation information, the terminal transmits the scheduling information by piggybacking the scheduling information and resets the request timer.

At a time t2, when the base station performs scheduling on the terminal and the terminal transmits all of current packets using the allocated resources, the buffer becomes empty. The base station transmits buffer empty information by piggybacking the buffer empty information. Since the current buffer is empty, the base station successfully receiving the buffer empty information stops scheduling on the link by a time t3. The terminal resets the request timer and does not increase the timer by the time t3 when the new packet arrives. Since the base station does not successfully receive the random access message, the base station does not reset the query timer, but continuously increases the query timer.

At the time t3, when the new packets arrive, the terminal transmits the random access message and operates the request timer.

At a time t4, the new packets arrive again and the same status as shown in the time t3 is repeated.

At a time t5, when the query timer of the base station is expired, the base station transmits the query to the terminal and resets the query timer. Since the terminal does not successfully receive the query, the request timer is reset.

At a time t6, resource is allocated and the terminal transmits the packet.

At a time t7, a new packet is generated. However, since resource is currently allocated, an additional random access message is not transmitted, but scheduling information on a changed buffer status is transmitted by piggybacking the scheduling information.

At a time t8, the terminal is scheduled. However, since the terminal does not successfully receive the resource allocation information, the request timer is not reset, but continuously increases.

At a time t9, the request timer is expired and the random access message is transmitted. The request timer is reset. Since the base station successfully receives the random access message, the query timer is reset.

An operation shown in the example 2 of FIG. 3 will be described.

The statuses of times t1 and t2 are the same as the status described in the example 1 of FIG. 3.

At a time t3, a new packet arrives at a status that the buffer is empty. The terminal transmits a random access message and the base station successfully receives the random access message.

At a time t4, the new packet arrives and the random access message is transmitted.

At times t4 and t5, although the new packet arrives and each random access message is transmitted, the base station does not successfully receive the random access message.

At a time t6, the query timer of the base station is expired and the query is transmitted.

At a time t7, the terminal is scheduled. When the query timer according to the present invention is not applied in the above example, it may cause waste in resource allocation at the time t7. For example, when quantities of packets arriving at the times t3 and t4 are set as 5000 bytes and 500 byte, respectively, it is assumed that the packets arriving at the time t3 are deleted due to delay access at the time t5. Since the base station does not receive the scheduling information at times t4 and t5, the base station grasps that the buffer of the current terminal is 5000 bytes. However, there are currently 500 bytes in the buffer of the terminal. Therefore, the base station performs scheduling of 5000 bytes at the time t7 and the resource space of 4500 bytes is wasted. When the query is normally performed at the time t6 by introduction of the query timer, the base station can exactly maintain the buffer status of the terminal later on.

Figure 4:
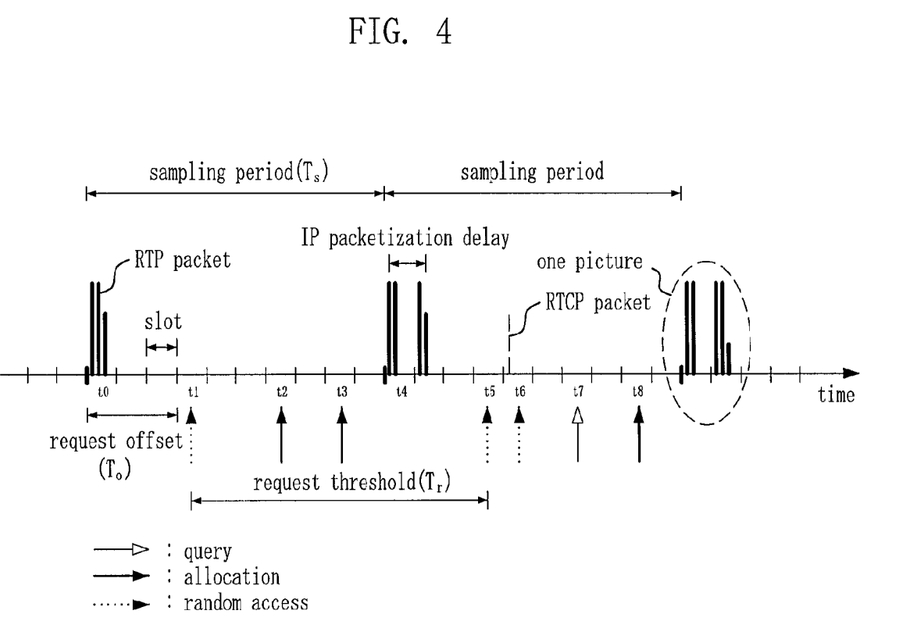
FIG. 4 shows an operation of the base station and the terminal when the timer-based resource request scheme according to the present invention is applied to periodic-interval variable-size (PV) traffic, which generates packets of variable sizes at a periodic interval.

FIG. 4 shows an operation of the base station and the terminal when the timer-based resource request scheme according to the present invention is applied to periodic-interval variable-size (PV) traffic, which generates packets of variable sizes at a periodic interval.

The traffic to which the timer-based resource request scheme according to the present invention is applied includes periodic-interval fixed-size (PF) traffic, PV traffic, and aperiodic-interval variable-size (AV) traffic. The PF traffic generates packets of a fixed size at a periodic interval. The PV traffic generates packets of variable sizes at a periodic interval. The AV traffic generates packets of variable sizes at an aperiodic interval. Voice over IP (VoIP), a Moving Picture Experts Group (MPEG) video, and a file transfer protocol (FTP) are examples of the PF traffic, the PV traffic and the AV traffic, respectively.

An operation of the case that the present invention is applied to the PV traffic will be described hereinafter with reference to FIG. 4.

A sampling period $T_s$ shows a periodic interval when the data arrive. Generally, it is set as $T_r=nT_s$ where n is a positive integer. A request offset $T_o$ is a time interval from a sampling time to a time when a random access message is transmitted.

At a time t0, the packets arrive at the buffer. The packets may arrive a series of slots at one sampling time and it occurs due to a time taken for converting the payload into an Internet protocol packet. The terminal resets the request timer and does not increase from the time t0 to the time t1, which is the time after the request offset. When the terminal does not receive the query or the resource allocation during the period, the terminal resets the request timer at the time t1 and transmits the random access message. When the base station successfully receives the random access message, the base station resets the query timer. Subsequently, resource is allocated in series at times t2 and t3, respectively. In particular, when a real-time transport protocol control protocol (RTCP) packet arrives at the time t6, the base station can transmit the random access message. Other basic operations are as described above.

As described above, the technology of the present invention can be realized as a program and stored in a computer-readable recording medium, such as CD-ROM, random accessM, ROM, floppy disk, hard disk and magneto-optical disk. Since the process can be easily implemented by those skilled in the art of the present invention, further description will not be provided herein.

While the present invention has been described with respect to certain preferred embodiments, it will be apparent to those skilled in the art that various changes and modifications may be made without departing from the scope of the invention as defined in the following claims.

INDUSTRIAL APPLICABILITY

The present invention can perform a resource request procedure at a proper time by processing the resource request procedure between a base station and a terminal based on a timer in a packet-based mobile telecommunication system.

Also, the present invention can secure quality of service (QoS) according to diverse uplink traffic characteristics in a Medium Access Control (MAC) layer of the packet-based mobile telecommunication system.

What is claimed is:

1. A timer-based resource requesting method in a mobile telecommunication system, comprising:
    waiting in a waiting mode for an event to occur while a request timer of a terminal operates;
    determining whether a service data unit exists in a terminal buffer when operation of the request timer ends at a predetermined threshold time;
    transmitting scheduling information including information on a quantity of packets existing in the terminal buffer from the terminal to a base station when the service data unit exists; and
    resetting the request timer and returning to the waiting mode, wherein the resetting the request timer comprises:
        resetting the request timer when the service data unit does not exist; and
        resetting the request timer after transmitting the scheduling information when the service data unit exists.

2. The resource requesting method of claim 1, wherein the scheduling information is transmitted based on a random access message.

3. The timer-based resource requesting method of claim 1, further comprising:
    waiting in a waiting mode for an event to occur while a query timer of a base station operates;
    receiving a random access message including the scheduling information from the terminal; and
    resetting the query timer and returning to the waiting mode.

4. A timer-based resource requesting method in a mobile telecommunication system, comprising:
- waiting in a waiting mode for an event to occur while a request timer of a terminal operates;
- receiving a query from a base station;
- determining whether a service data unit exists in a terminal buffer;
- transmitting scheduling information from the terminal to the base station based on resource allocation information of the query when the service data unit exists;
- transmitting buffer empty information to the base station when determining that the service data unit does not exist; and
- resetting the request timer and returning to the waiting mode, wherein the resetting the request timer comprises:
  - resetting the request timer after transmitting the scheduling information when the service data unit exists; and
  - resetting the request timer after transmitting the buffer empty information when the service data unit does not exist,
- wherein the query includes uplink resource allocation information for transmitting the scheduling information.

5. The timer-based resource requesting method of claim 4, further comprising:
- waiting in a waiting mode for an event to occur while a query timer of a base station operates;
- transmitting the query to the terminal when operation of the query timer ends at a predetermined threshold time; and
- resetting the query timer and returning to the waiting mode.

* * * * *